A. C. MURPHY.
MOTOR DRIVEN DUMPING WAGON.
APPLICATION FILED APR. 11, 1914.
1,235,045.
Patented July 31, 1917.
2 SHEETS—SHEET 1.
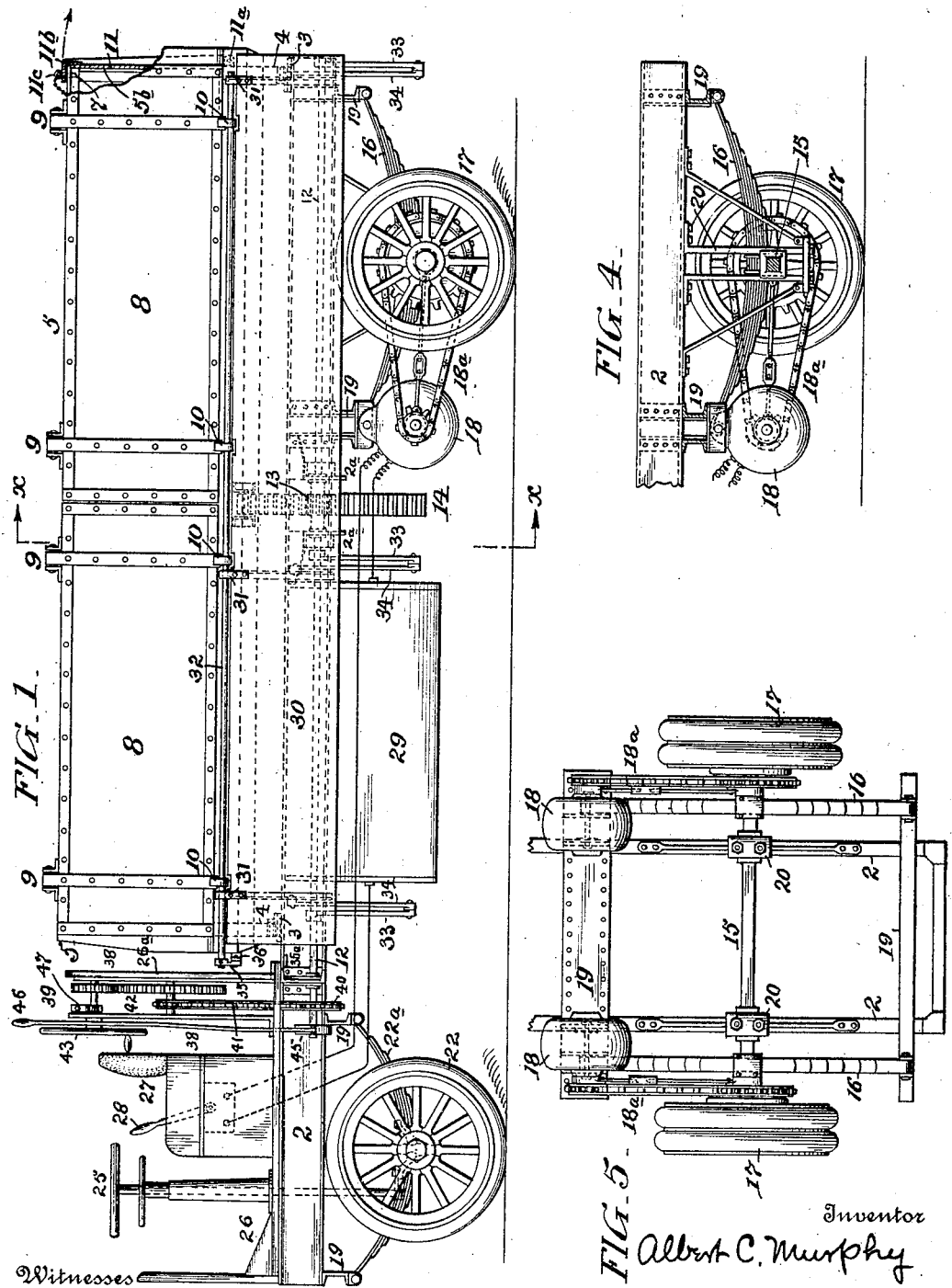
Witnesses
Daniel Webster, Jr.
E. W. Smith.
Inventor
Albert C. Murphy
By 
Attorney A. C. MURPHY.
MOTOR DRIVEN DUMPING WAGON.
APPLICATION FILED APR. 11, 1914.
1,235,045.
Patented July 31, 1917.
2 SHEETS—SHEET 2.
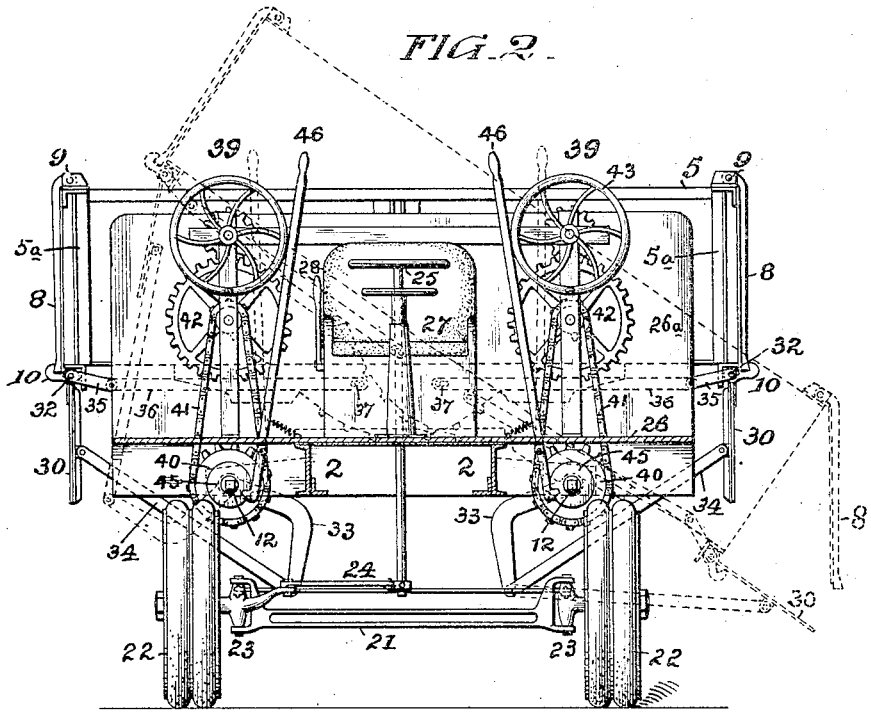
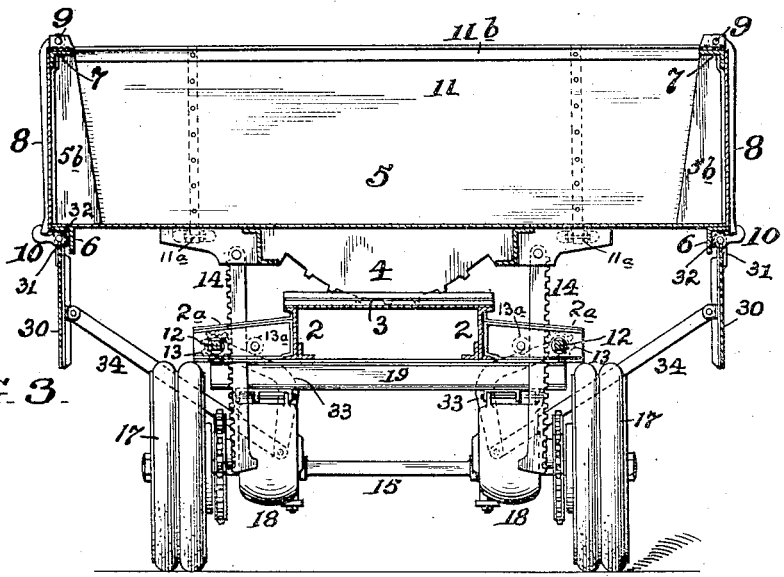
Witnesses
Daniel Webster Jr.
E. W. Smith.
Inventor
Albert C. Murphy
By 
Attorney

UNITED STATES PATENT OFFICE.

ALBERT C. MURPHY, OF NEW YORK, N. Y.

MOTOR-DRIVEN DUMPING-WAGON.

1,235,045.    Specification of Letters Patent.    Patented July 31, 1917.

Application filed April 11, 1914. Serial No. 831,161.

*To all whom it may concern:*

Be it known that I, ALBERT C. MURPHY, citizen of the United States, and resident of New York, county of New York, and State of New York, have invented an Improvement in Motor-Driven Dumping-Wagons, of which the following is a specification.

The object of my invention is to provide a suitable construction of motor driven dumping wagon which shall be flexible in its use and capable of transporting and mechanically dumping its contents, preferably from either side.

My invention consists in a suitable motor driven truck having steering means, said truck having at one end the operator's platform and seat, combined with a body supported upon the truck frame through rockers by which it may be tilted to discharge, preferably to either side, said body provided with hinged side doors which may be automatically released during the tilting operation, and power devices for tilting the body comprising one or more longitudinal shafts, means between the shafts and the body for tilting it, and means arranged at the end portion of the truck frame adjacent to the operator's seat for rotating said longitudinal shafts; further in the above stated mechanism, when provided with means to lock the longitudinal shafts in position against rotating during the periods of transportation; and also in the mechanism specified, when the side or sides of the body are provided with guiding aprons constituting chutes for guiding the discharging contents to a reasonable distance away from the wheels.

My invention also comprehends details of construction which, together with the features above specified, will be better understood by reference to the drawings, in which:—

Figure 1 is a side elevation of a self-propelled and steerable dumping wagon embodying my invention; Fig. 2 is a front elevation of the same with the front portion of the operator's platform broken away; Fig. 3 is a cross section of Fig. 1 taken on line $x$—$x$ looking toward the rear of the vehicle; Fig. 4 is a longitudinal sectional view of the rear portion of the truck; and Fig. 5 is an inverted plan view of the rear portion of the truck showing the motor driven rear wheels.

2 is a truck frame and comprises longitudinal girders which are connected at intervals by transverse beds 3 and by transverse girders 19. The forward part of this truck frame is broadened to provide the operator's platform 26 which may be almost as wide as the body 5, which is supported on the truck frame in the manner hereinafter described. The truck frame may be supported upon the driving wheels 17 and the steering wheels 22, and these may be attached in any suitable manner and the driving wheels may be driven by any suitable power. As shown, the axle 15 of the driving wheels 17 is guided in the upright guides 20 secured to the truck frame and suitably braced, and the weight of the truck frame at the rear is carried upon the heavy springs 16 which are bolted to the axle and have their ends hinged to the transverse girders 19 of the truck frame. In the particular illustration shown, electric motors 18 are employed as the motive power, and these transmit motion to the driving wheels by the usual transmission means $18^a$ comprising chain and sprocket gears. As shown, these motors are hinged to the transverse girders 19. The steering wheels 22 are connected with the front axle 21 by means of the usual knuckle joints 23, the same being operated by the steering wheel 25 and the connections 24. The means for operating the steering wheels may be of any suitable construction, that shown being given by way of example. The weight of the forward part of the truck is carried upon the steering axle 21 by means of the springs $22^a$, and the forward axle may be sustained, if desired, by similar guides 20 extending down from the truck frame, but such guides as well as the springs have been omitted from Fig. 2 of the drawing for the purpose of more clearly illustrating the other mechanism to the rear. It is immaterial to my invention as to the particular manner of supporting the truck frame upon its wheels and axles, it being sufficiently within the province of my improvements that the truck shall be self-driven and steerable as distinguished from an ordinary railway car which is neither self-driven nor steerable. As further illustration of the usual construction, 29 indicates a compartment carrying batteries for supplying energy to the electric motors 18, and 28 is the controller which is arranged adjacent to the operator's seat 27 at the forward part of the truck and above the platform 26 thereof, As shown, the steering wheel 25 is immediately in front of the operator's seat.

Arranged above the rear portion of the truck frame is a tilting body 5, said body being supported by means of transverse rockers 4 working in connection with beds 3 upon the truck frame. In the particular illustration, I have shown two such rockers, one at each end of the body, but it is manifest that more of such rockers may be employed if so desired. As shown, this body 5 is open at each side and is provided at the lower part with the longitudinal angle-iron 6 and at the upper part with the longitudinal angle-iron 7, which coupled with the uprights at the forward and rear portions 5ª and 5ᵇ respectively, constitutes rectangular open frames at each side. These openings are normally closed by doors 8 which are hinged at their upper ends as indicated at 9, so that they normally close when the body is horizontal and tend to open when the body is tilted. These doors are normally kept closed by means of locking means 10 in the form of hooks which engage the lower parts of the doors, said hooks being carried by rocking shafts 32 journaled adjacent to the angle-iron 6 of the body and adapted to be rocked by suitable mechanism for automatically releasing the doors in the manner hereinafter described. As shown, I have indicated two sets of doors 8 at each side of the body, but this is not essential, as said doors may be operated as a unit. While the rear of the body may be solid or permanent as is the front thereof, nevertheless I prefer to so construct the rear that it is provided with a hinged door 11, said door being hinged at its lower part at 11ª, and adapted to be turned backward and downward as indicated by the arrow in Fig. 1. The upper part of this door 11 may be heavily braced with an angle-iron 11ᵇ, which under normal conditions may be secured to the side angle-irons 7 and the corner braces 5ᵇ by means of locking means 11ᶜ. In some cases where it is necessary to use the wagon for the conveyance of articles which either have great length or which must be discharged from the rear, this door 11 at the rear would be employed and may be let down for the purposes of introducing or discharging the load. Under all other conditions, the door is made to act as a normally closed end and serves as a rigid brace across the framing of the sides to prevent said framing being spread. Where no requirement for the use of such end door occurs, the same may be permanently bolted or riveted in place.

Arranged along either side of the truck frame and journaled in extensions 2ª thereof, are the longitudinal shafts 12. These shafts are provided with pinions 13 which engage racks 14, the upper ends of which are hinged to the under part of the body 5 somewhat nearer the side than the rockers 4 extend. The racks 14 are held in mesh with the pinions 13 by suitable guide rollers 13ª carried on the lateral extensions 2ª of the truck frame. By rotating either of these shafts 12, the body 5 may be oscillated upon its rockers. In the ordinary operation, the shaft 12 is rotated so that the rack 14 is pushed upward when tilting the body in the act of discharge. I have shown two of such shafts and their connections, one for each side of the same body, so that either one may be employed for the upward thrust according to which side the body is required to discharge its contents. Moreover, the support of the body in a horizontal position may be maintained in a more stable manner by providing the two sets of operating means, because each of these shafts is provided with a locking means to prevent its rotation during the time when the vehicle is being transported and when the body is in its horizontal position. As shown, these shafts 12 extend to the forward part of the truck frame, and are provided with locking disks 45 each having a notch with which the lower end of the corresponding pivoted locking lever 46 engages. As shown in Fig. 2, each of the locking disks 45 is engaged by the respective locking levers 46, so that they are held against rotation, and in this position the body is horizontal. In addition to the locking disks 45, the ends of these shafts 12 are provided with the sprocket wheels 40, said sprocket wheels being rotated by sprocket chains 41 which are driven by means of hand operated gearing 42 of a speed reducing and power multiplying character and which are driven by the hand operated wheels 43. This operating mechanism is indicated at 39, and is shown as arranged in the space 38 between the driver's seat 27 and the end of the body 5. In this manner, the operative mechanism for controlling the tilting of the body is adjacent to the operator's platform, whereby after running the vehicle into the proper position to insure the discharge of the contents where needed, the operator may quickly operate the body to discharge the contents without moving far from his operating position in running the vehicle. The arrangement provides capacity for one man handling the entire vehicle, not only for controlling the propelling of it, but the dumping mechanism as well. Moreover, it will be seen that the two operating mechanisms 39 are respectively arranged at the opposite side of the operator's seat and to the rear thereof, and the seat is preferably made narrow so as to leave full standing room immediately in front of each one of said operating mechanisms. Furthermore, the locking levers 46 of the two mechanisms are arranged sufficiently close that the operator at one of the mechanisms 39 is within full reach of the locking lever 46 of the other mechanism, so that when starting to tilt the body, he may readily disengage the lock for the shaft 12 which he is not operating, so that there will be no resistance to said shaft turning under the positive impulse given to it through the tilting body. The operating mechanisms 39 are provided with pawl and ratchets 47 to prevent the hand wheel 43 from rotating backward during the act of tilting the body, and these ratchets on the two operating mechanisms 39 point in opposite directions so that when the hand wheel of the right-hand mechanism is being operated to tilt the body into the position indicated in dotted lines, Fig. 2, the pawl and ratchet of the other mechanism is not interfering, and vice versa. The purpose of the pawl and ratchet is to prevent the body returning to a horizontal position against the wish of the operator during the dumping adjustment.

When the body 5 is tilted as indicated in dotted lines (Fig. 2) and the contents are being discharged, it is desirable to guide the said contents as far away from the wheels as possible, so that the truck is not required to run too close to an embankment or other place where the discharge is to take place. To provide for this, I hinge at the lower edge or bottom angle-iron 6 at each side of the body, an apron or chute 30, the hinged joints thereof being indicated at 31. When the body is horizontal, these aprons 30 hang vertical, but when the body is tilted the apron on the discharge side is swung to an oblique position (see dotted lines Fig. 2). The adjustment of these aprons is done automatically in the following manner:—

Loosely hinged upon the shafts 12 are the arms 33, the free ends of which are connected by links 34 with the aprons 30. When the body is tilted from the position of full lines to that of dotted lines, Fig. 2, the lowering of the apron 30 tends to bring it closer to the free end of the arms 33, but as the arms cannot move backward because of contact with the longitudinal girders of the truck frame, the bars 34 act as radial bars and force the lower end of the aprons outward so that they act as oblique guiding aprons or chutes for the discharging contents of the body. While this action is taking place on one side, the upward movement of the aprons at the other side pulls the bars 34 upward and this pulls the pivoted arms 33 around and upward at their free ends, as clearly indicated in dotted lines in Fig. 2, thereby offering no resistance to the upward movement of the apron, but at all times assuming a position upon righting the body that will insure the apron being swung outward in an oblique position should that particular side of the body be lowered for the next dumping operation. I have described my preferred form of means for operating the tilting body and for guiding the contents away from the vehicle, but I do not restrict myself to these particular means, as they may be modified or other equivalent means employed in lieu thereof.

As before stated, the latches or locks 10 are automatically operated to release the hinged doors 8 when the body is being tilted for discharging the contents, and the following means is employed for accomplishing this automatic unlocking of the doors:—

The rock shaft 32 is provided at the end with an arm 35 by which it may be rocked, and this arm is hinged to a rod 36, whose other end is slidably connected at 37 with the body near its axis. When the body is horizontal, the arm 35 and the rod 36 have their hinged joint in a plane below a line between the axis of the rock shaft 32 and the slidable connection 37, so that in this position the latches 10 engage the bottom edges of the doors and no outward thrust can release them. However, when the body is tilted from the solid to the dotted line position, the said bar 36 is brought into contact with a portion 36$^a$ of the truck frame, which arrests the further downward movement of the said bar and oscillates the arm 35 to rock the rock shaft 32 and the latches 10 to release the door when the dumping position is just about to be assumed. In this manner, the door on the dumping side is automatically released, whereas the door on the other side remains in its locked condition. Any other suitable form of door locking mechanism may be employed as I do not restrict myself in this respect.

While I have shown my improvements in a commercial form of dumping wagon having self-driven means as well as being self-steerable, it will be understood that the various details may be more or less modified without departing from the spirit of the invention, and I therefore do not restrict myself to the minor details shown.

Having now described my invention, what I claim as new and desire to secure by Letters Patent, is:—

1. In a dumping vehicle, a truck frame supported on wheels, said truck frame also having an operator's platform near one end, combined with a dumping body supported above the truck frame and adapted to rock for discharging to either side of the same, two longitudinal shafts journaled upon the truck frame near each lateral side thereof, mechanical connections between the shafts and the body at opposite sides of its point of support upon the truck frame and each adapted to oscillate the body and also support the body against up and down movements when required, a separate locking device at the platform for each of the longitudinal shafts whereby they may be rigidly locked to hold the body in horizontal position during transportation, separate hand operated means also located at the platform for each of the shafts for independently imparting a slow rotation thereto for adjusting the body, and doors at the sides of the body for discharging the contents thereof by gravity from either side of the body when tilted.

2. In a dumping vehicle, a truck frame supported on wheels and having an operator's platform at one end only, combined with a dumping body of a length substantially equal to the truck frame from one end thereof to the platform, said dumping body supported upon the truck frame so as to rock to either side for dumping and comprising a solid bottom and end adjacent to the platform and further having at the other end two upright corner brackets secured to the bottom and respectively connected at their tops with the lateral upper parts of the solid end adjacent to the platform by separate longitudinal girder frames providing lateral discharge openings and a rear discharge opening, the latter unobstructed from above, doors hinged to the lateral girder frames and normally closed against the bottom of the body for controlling the discharge of the contents of the body from the sides thereof when tilted, suitable locks for said doors, an end door for the open end of the body hinged adjacent to the floor and fitting against the corner brackets when in closed position, and locking means for locking the end door in its closed position to the corner brackets and longitudinal frames.

In testimony of which invention, I hereunto set my hand.

ALBERT C. MURPHY.

Witnesses:
DOROTHY F. WATERBURY,
SAMUEL G. REA.

Copies of this patent may be obtained for five cents each, by addressing the "Commissioner of Patents, Washington, D. C."